US008873387B2

(12) United States Patent
Chan et al.

(10) Patent No.: US 8,873,387 B2
(45) Date of Patent: Oct. 28, 2014

(54) NETWORK CONGESTION CONTROL FOR MACHINE-TYPE COMMUNICATIONS

(75) Inventors: Yee Sin Chan, San Jose, CA (US); Jin Yang, Orinda, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/324,074

(22) Filed: Dec. 13, 2011

(65) Prior Publication Data

US 2013/0148497 A1 Jun. 13, 2013

(51) Int. Cl.
H04L 12/26 (2006.01)
(52) U.S. Cl.
USPC .......................................................... 370/230
(58) Field of Classification Search
USPC .................. 370/230, 232, 235, 328, 311, 468; 375/259; 709/228
See application file for complete search history.

(56) References Cited

U.S. PATENT DOCUMENTS

| 2007/0223525 | A1* | 9/2007 | Shah et al. ...................... 370/468 |
| 2008/0273478 | A1* | 11/2008 | Budde et al. ................... 370/311 |
| 2011/0199905 | A1* | 8/2011 | Pinheiro et al. ................ 370/235 |
| 2011/0261891 | A1* | 10/2011 | Vos et al. ....................... 375/259 |
| 2011/0296039 | A1* | 12/2011 | Deu-Ngoc et al. ............. 709/228 |
| 2012/0033613 | A1* | 2/2012 | Lin et al. ........................ 370/328 |
| 2012/0039171 | A1* | 2/2012 | Yamada et al. ................ 370/232 |
| 2012/0052864 | A1* | 3/2012 | Swaminathan et al. ....... 455/436 |
| 2012/0155257 | A1* | 6/2012 | Tiwari ............................ 370/230 |
| 2012/0257571 | A1* | 10/2012 | Liao ............................... 370/328 |
| 2012/0281530 | A1* | 11/2012 | Sambhwani et al. .......... 370/230 |
| 2013/0083653 | A1* | 4/2013 | Jain et al. ....................... 370/230 |

OTHER PUBLICATIONS

3GPP TS 22.368 V11.3.0; $3^{rd}$ Generation Partnership Project; Technical Specification Group Services and System Aspects; Service requirements for Machine-Type Communications (MTC); Stage 1 (Release 11); pp. 1-24; Nov. 2009.
3GPP TSG RAN WG2 #69bis; "Discussion on RACH congestion for MTC", pp. 1-3; Beijing, China; Apr. 12-16, 2010.
3GPP TSG SA WG2 Meeting #78; "Key issue—Signalling congestion in PS core network", pp. 1-4; San Francisco, California; Feb. 22-26, 2010.

* cited by examiner

*Primary Examiner* — Chirag Shah
*Assistant Examiner* — Jael Ulysse

(57) ABSTRACT

A machine-type communications (MTC) device may attempt a network attach operation corresponding to a wireless network, and receive quality of service information, from the wireless network, in response to the network attach operation failing. The MTC device may determine a back-off time based on the quality of service information received from the wireless network. The back-off time may include a duration of time before re-attempting the network attach operation. The MTC device may re-attempt the network attach operation in response to detecting an expiration of the back-off time.

20 Claims, 8 Drawing Sheets

FIG. 6

| DEVICE SERVICE | SERVICE IDENTIFIER | QoS CLASS |
|---|---|---|
| EMERGENCY | 1111 | AAAA |
| HOME INVASION | 2222 | AAAA |
| ELECTRICITY METER | 3333 | BBBB |
| GAS METER | 4444 | CCCC |
| ... | ... | ... |

600

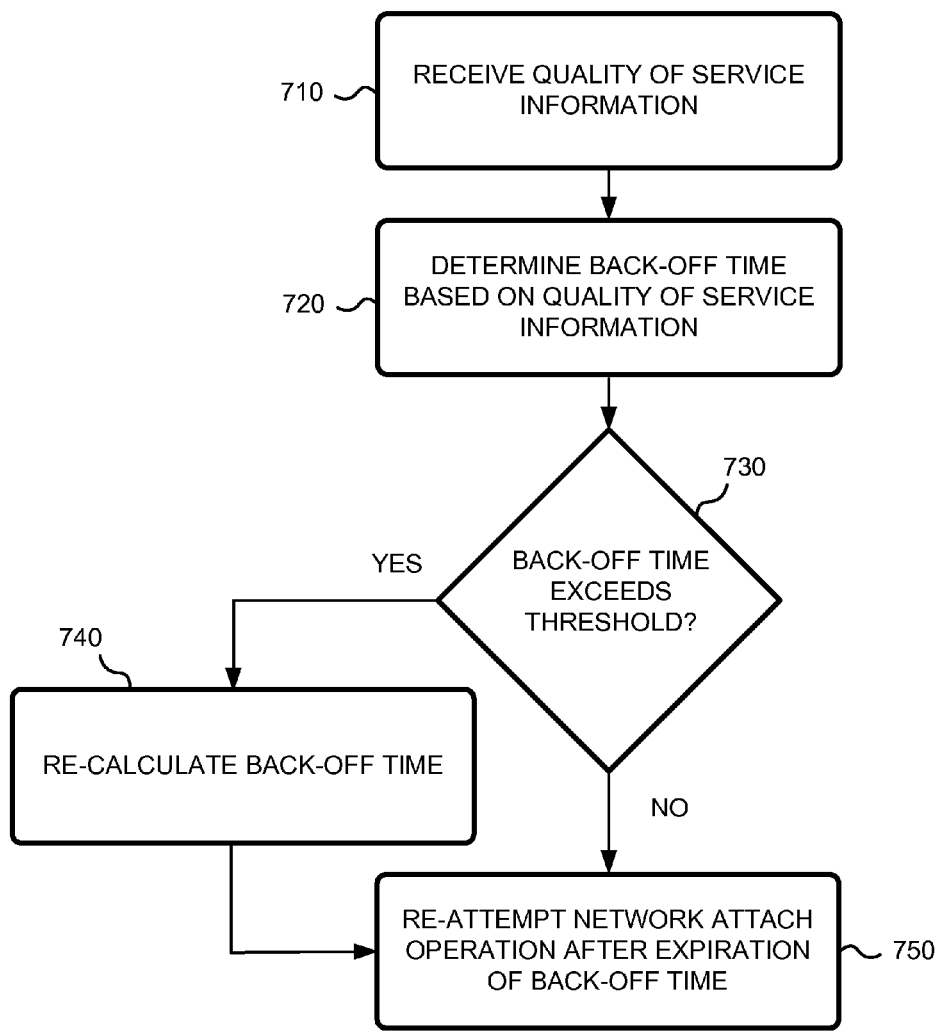

810 — BACK-OFF TIME = T(QoS) + k * t(QoS)

Where:

T is a duration that is based on the QoS information, k is a randomly generated number between $2^h - 1$, h is a quantity of failed network attach attempts, and t is a unit of time based on the QoS information.

820 — BACK-OFF TIME = k * t

Where:

k is a randomly generated number between $2^h - 1$, h is a quantity of failed network attach attempts, and t is a default unit of time

NETWORK CONGESTION CONTROL FOR MACHINE-TYPE COMMUNICATIONS

BACKGROUND

As wireless network technologies evolve toward mobile broadband networks, emerging applications are competing for radio resources with traditional voice and data services. Among these emerging applications are machine-type communications (MTC), such as automatic metering for utility companies (e.g., electrical, gas, and water). One of the characteristics of MTC is the potential for an enormous quantity of MTC devices to attempt to access a network simultaneously, thereby causing network congestion and compromising network performance.

BRIEF DESCRIPTION OF THE DRAWINGS

FIG. 6 is a diagram of an example quality of service (QoS) map data structure according to one or more implementations described herein;

FIG. 7 is a diagram of an example process for re-attempting a network attach operation according to one or more implementations described herein; and FIG. 8 is a diagram of example formulas for determining a back-off time according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to control network congestion for machine-type communications (MTC). For example, an MTC device may attempt a network attach operation, but fail due to network congestion. In response, the network may identify a quality of service (QoS) class corresponding to the MTC device and provide the QoS class to the MTC device. The MTC device may use the QoS class to calculate a back-off time (e.g., an amount of time that the MTC device should wait) for attempting another network attach operation.

Since the back-off time determined by the MTC device is based on information received from the network, one or more of the implementations, described herein, may provide a solution to centralizing the management and control of MTC devices as they relate to back-off times. In addition, since the back-off time may be based on QoS information and since different types of MTC devices may correspond to different QoS classes, one or more of the implementations, described herein, may provide a convenient and effective solution to diffusing network congestion by staggering back-of times. Additionally, or alternatively, since back-of times may be based on QoS classes, one or more of the implementations, described herein, may help ensure that back-off times for different types of MTC devices are appropriate. For instance, a MTC device associated with a less urgent service (e.g., a electricity meter) may have a greater back-off time than a MTC device associated with a more urgent service (e.g., a home invasion alarm system).

Figure 1:
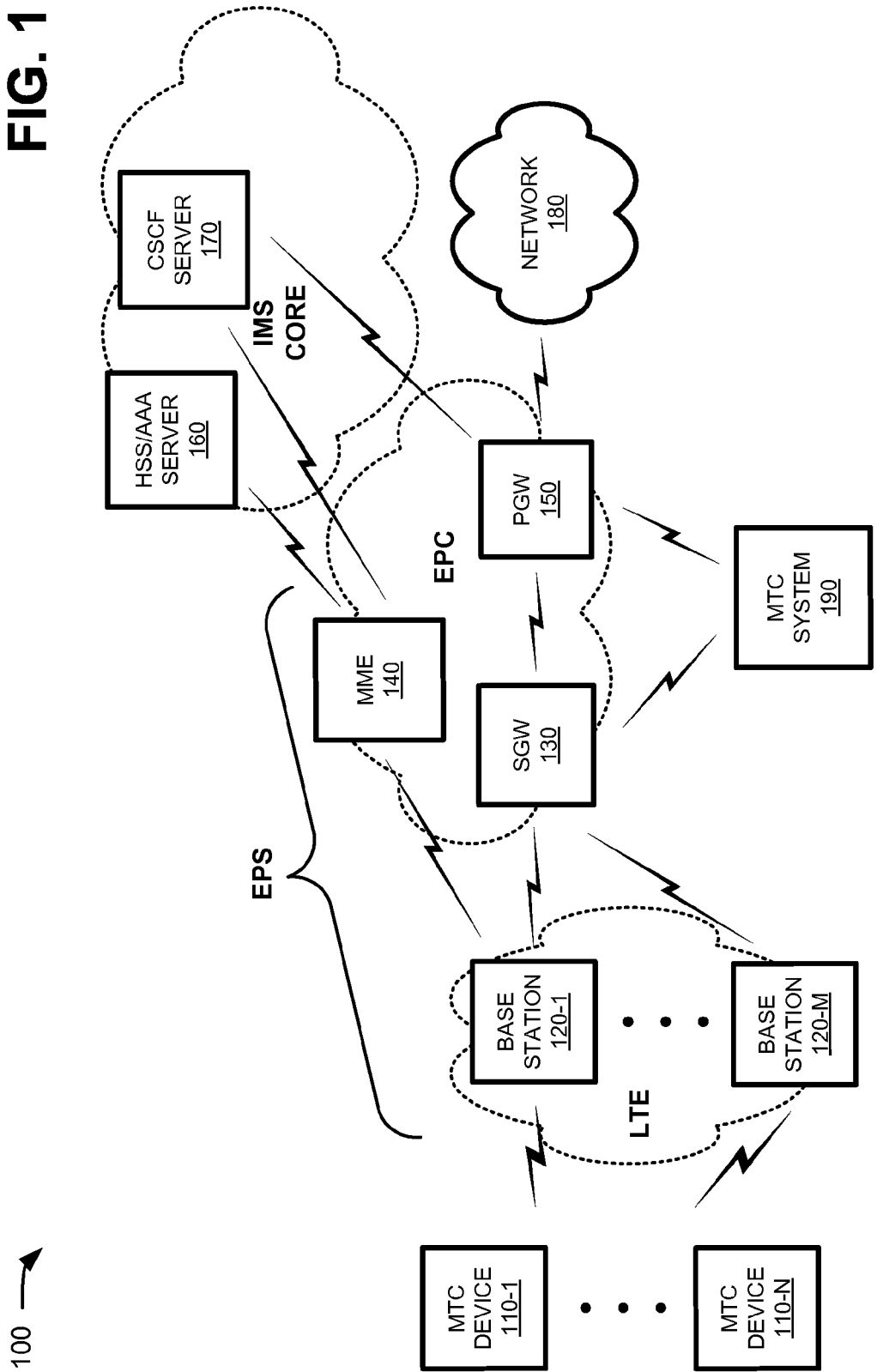
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include MTC devices 110-1, . . . , 110-N (where N≥1) (hereinafter referred to collectively as "MTC devices 110," and individually as "MTC device 110"), a group of base stations 120-1, . . . , 120-M (where M≥1) (hereinafter referred to collectively as "base stations 120," and individually as "base station 120"), a serving gateway 130 (hereinafter referred to as "SGW 130"), a mobility management entity device 140 (hereinafter referred to as "MME 140"), a packet data network (PDN) gateway (PGW) 150, a home subscriber server (HSS)/authentication, authorization, accounting (AAA) server 160 (hereinafter referred to as an "HSS/AAA server 160"), a call session control function (CSCF) server 170 (hereinafter referred to as "CSCF server 170"), a network 180, and a MTC system 190.

The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Further, one or more implementations are described as being performed within a RAN that is based on a long term evolution (LTE) network for explanatory purposes. In other implementations, the implementations may be performed within a RAN that is not based on a LTE network.

Environment 100 may include an evolved packet system (EPS) that includes a LTE network and/or an evolved packet core (EPC) that operate based on a third generation partnership project (3GPP) wireless communication standard. The LTE network may be a RAN that includes one or more base stations 120 that take the form of evolved Node Bs (eNBs) via which MTC device 110 communicates with the EPC. The EPC may include SGW 130, MME 140, and/or PGW 150 that enable MTC device 110 to communicate with network 180 and/or an Internet protocol (IP) multimedia subsystem (IMS) core. The IMS core may include HSS/AAA server 160 and/or CSCF server 170 and may manage authentication, session initiation, account information, profile information, etc. associated with MTC devices 110.

MTC device 110 may include a device, such as a wireless mobile communication device, that is capable of communicating with base station 120 and/or a network (e.g., network 180). For example, MTC device 110 may include a electricity meter, a natural gas meter, a water usage meter, a vending machine, a point-of-sale device, a health-care device, security equipment, surveillance equipment, manufacturing equipment, or another type of device capable of communicating with base station 120 and/or a network (e.g., network 180). MTC device 110 may include a particular device or machine capable of leveraging a wireless network but with minimal to no sustained human interaction.

Base station 120 may include one or more devices that receive, process, and/or transmit traffic, such as audio, video, text, and/or other data, destined for and/or received from MTC device 110. In an example implementation, base station 120 may be an eNB associated with the LTE network that receives traffic from and/or sends traffic to network 180 via SGW 130 and PGW 150. Base station 120 may send traffic to and/or receive traffic from MTC device 110 via an air interface. In another example, one or more other base stations 120 may be associated with a radio access network (RAN) that is not associated with the LTE network.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to network 180 (e.g., via PGW 150) and/or other network devices associated with the IMS core and/or the EPC. SGW 130 may also receive traffic from the other network devices and/or may send the received traffic to MTC device 110 via base station 120. SGW 130 may perform operations associated with handing off MTC device 110 from and/or to the LTE network.

MME 140 may include one or more devices that gather, process, search, store, and/or provide information in a manner described herein. For example, MME 140 may perform operations associated with handing off MTC device 110, from a first base station 120 to a second base station 120, when MTC device 110 is exiting a cell associated with the first base station 120. MME 140 may, in yet another example, perform an operation to handoff MTC device 110 from the second base station 120 to the first base station 120 when MTC device 110 is entering the cell associated with first base station 120.

PGW 150 may include one or more devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 180. In another example implementation, PGW 150 may receive traffic from network 180 and may send the traffic toward MTC device 110 via SGW 130.

HSS/AAA server 160 may include one or more server devices, or other types of computation or communication devices, that gather, process, search, store, and/or provide information in a manner described herein. For example, HSS/AAA server 160 may manage, update, and/or store, in a memory associated with HSS/AAA server 160, profile information associated with MTC device 110 that identifies applications and/or services that are permitted for and/or accessible by MTC device 110, information associated with a user of MTC device 110 (e.g., a username, a password, a personal identification number (PIN), etc.), rate information, minutes allowed, and/or other information. Additionally, or alternatively, HSS/AAA server 160 may include a device that performs authentication, authorization, and/or accounting (AAA) operations associated with a communication session with MTC device 110.

CSCF server 170 may include one or more server devices, or other types of computation or communication devices, that gather, process, search, store, and/or provide information in a manner described herein. CSCF server 170 may process and/or route calls to and from MTC device 110 via the EPC. For example, CSCF server 170 may process calls, received from network 180, that are destined for MTC device 110. In another example, CSCF server 170 may process calls, received from MTC device 110, that are destined for network 180.

Network 180 may include one or more wired and/or wireless networks. For example, network 180 may include a cellular network, a public land mobile network (PLMN), a second generation (2G) network, a 3G network, a 4G network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), a backhaul and/or management network, and/or a combination of these or other types of networks.

MTC system 190 may include one or more types of computing or communication devices. For example, network management system 190 may include a desktop computer, a server, a cluster of servers, or one or more other types of computing or communication devices. MTC system 190 may be capable of monitoring network congestion levels corresponding to one or more base stations 120. Additionally, or alternatively, MTC system 190 may store information associating MTC devices 110, or types of MTC devices 110, with QoS classes or other types of QoS information.

While implementations herein are described primarily in the context of broadband services via LTE, other wireless standards may be used. For example, components conforming to LTE standards described herein may be replaced by components conforming to other network standards (e.g., Global System for Mobile Communications (GSM), Wideband Code Division Multiple Access (WCDMA), Universal Mobile Telecommunications System (UMTS), Code Division Multiple Access 2000 (CDMA2000), High Speed Packet Access (HSPA), 802.11, or other network standards).

Figure 2:
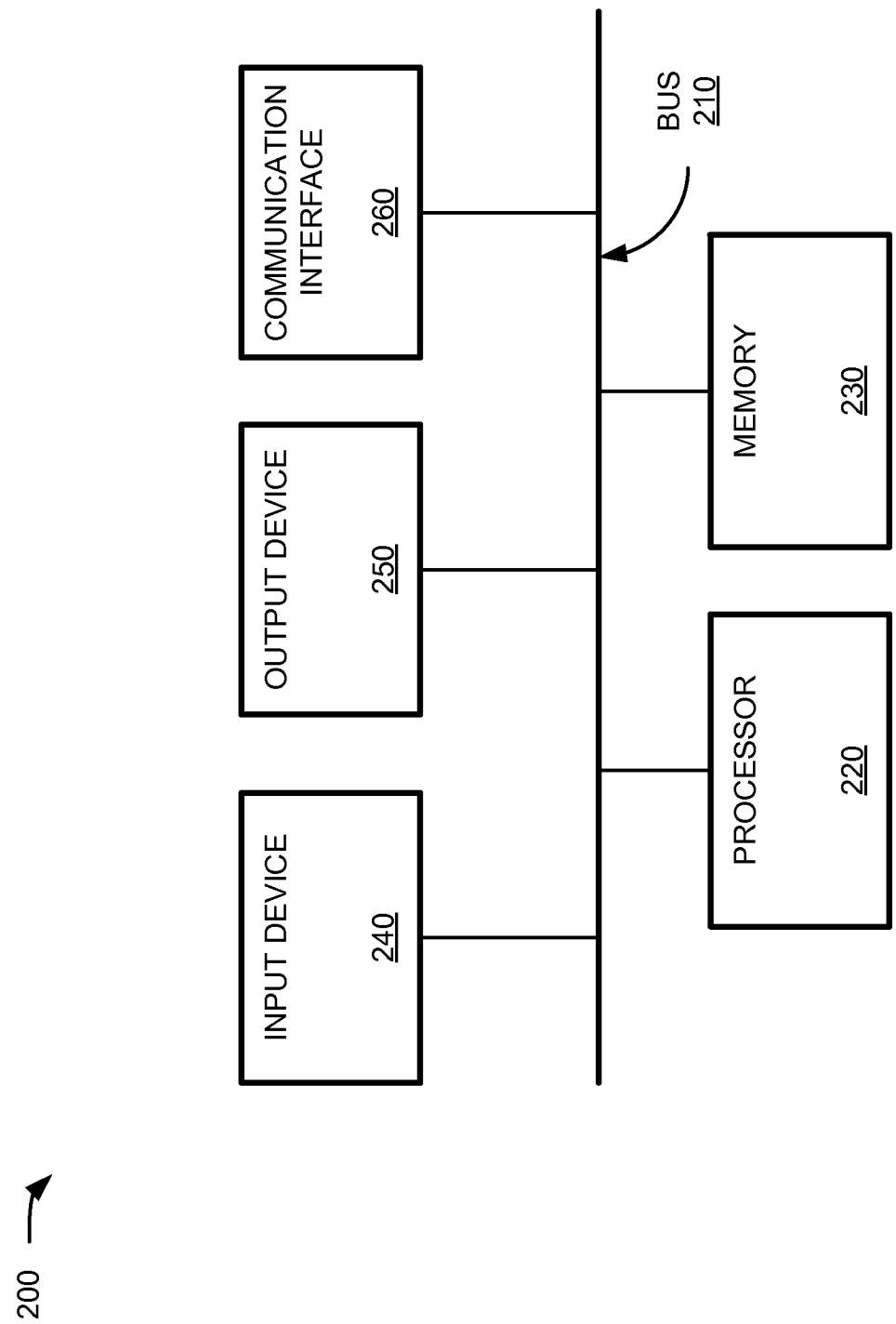
FIG. 2 is a diagram of an example of a device of FIG. 1.

FIG. 2 is a diagram of example components of device 200 that may be used within environment of FIG. 1. For example, device 200 may correspond to MTC device 110, SGW 130, MME 140, PGW 150, HSS/AAA server 160, CSCF server 170, and/or MTC system 190. Each of MTC device 210, SGW 130, MME 140, PGW 150, HSS/AAA server 160, CSCF server 170, and/or MTC system 190 may include one or more devices 200 and/or one or more of the components of device 200.

As depicted, device 200 may include bus 210, processor 220, memory 230, input device 240, output device 250, and communication interface 260. However, the precise components of device 200 may vary between implementations.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated) and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 230 may also include an antenna (or a set of antennas) that permit wireless communication, such as the transmission and reception of radio frequency (RF) signals.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

The number of components, illustrated in FIG. 2, is provided for explanatory purposes only. In practice, there may be additional components, fewer components, different components, or differently arranged components than illustrated in FIG. 1. For instance, device 200 may correspond to an electricity meter, and may include one or more components for measuring electricity.

Figure 3:
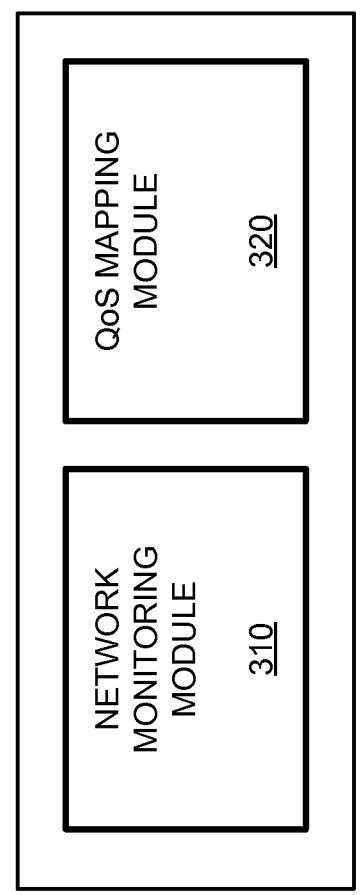
FIG. 3 a diagram of example functional components of a MTC system according to one or more implementations described herein.

FIG. 3 is a diagram of example functional components of MTC system 190 according to one or more implementations described herein. As depicted, MTC system 190 may include network monitoring module 310 and QoS mapping module 320. Depending on the implementation, one or more of modules 310-320 may be implemented as a combination of hardware and software based on the components illustrated and described with respect to FIG. 2. Alternatively, modules 310-320 may each be implemented as hardware based on the components illustrated and described with respect to FIG. 2.

Network monitoring module 310 may provide functionality with respect to monitoring network conditions. For example, network monitoring module 310 may enable network management system 190 to detect network attach operations involving MTC device 110. Network monitoring module 310 may also, or alternatively, enable network management system 190 to monitor one or more conditions with a wireless network. Examples of such network conditions may include a level of network congestion corresponding to one or more base stations 120 in an LTE network or another type of wireless network. Additionally, or alternatively, network monitoring module 310 may enable MTC system 190 to detect a failed network attach operation and/or determine whether a current level of network congestions exceeds a particular congestion level threshold. Doing so may enable MTC system 190 to determine whether the failed network attach operation was due to the level of congestion in the network.

QoS mapping module 320 may provide functionality with respect to QoS within a network. For example, QoS mapping module 320 may enable MTC system 190 to identify a MTC device, or a type of MTC device, corresponding to a failed network attach operation and determine a QoS class or another type of QoS information associated with the MTC device. In some implementations, QoS mapping module 320 may manage or maintain a QoS map data structure that associates types of MTC device identifiers with QoS classes. QoS mapping module 320 may also, or alternatively, enable MTC system 190 to provide a QoS class or another type of QoS information to MTC device 110.

In addition to the functionality described above, the functional components of network management server 190 may also, or alternatively, provide functionality as described elsewhere in this description. For example, in some implementations, MTC system 190 may perform one or more operations described as being performed by MTC device 110. Further, while FIG. 3 shows a particular number and arrangement of modules, in alternative implementations, MTC system 190 may include additional modules, fewer modules, different modules, or differently arranged modules than those depicted.

Figure 4:
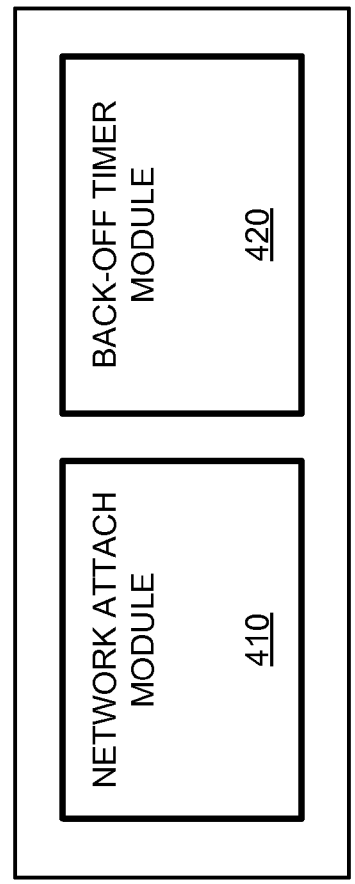
FIG. 4 is a diagram of example functional components of a MTC device according to one or more implementations described herein.

FIG. 4 is a diagram of example functional components of an MTC device 110 according to one or more implementations described herein. As depicted, MTC device 110 may include network attach module 410 and back-off timer module 420. Depending on the implementation, one or more of modules 410-420 may be implemented as a combination of hardware and software based on the components illustrated and described with respect to FIG. 2. Alternatively, modules 410-420 may each be implemented as hardware based on the components illustrated and described with respect to FIG. 2.

Network attach module 410 may provide functionality with respect to network attach operations. For example, network attach module 410 may enable MTC device 110 to perform a network attach operation corresponding to a particular network, such as an LTE network. Network attach module 410 may also, or alternatively, enable MTC device 110 to determine if or when an network attach operation has failed and may cause MTC device 110 do obtain or receive QoS information (e.g., a QoS class) from MTC system 190. In some implementations, network attach module 410 may also, or alternatively, enable MTC device 110 to attempt another network attach operation in response to, for example, the expiration of a back-off timer.

Back-off timer module 420 may provide functionality with respect to a back-off timer of MTC device 110. For example, back-off timer module 420 may enable MTC device 110 to determine or otherwise calculate a back-off time based on QoS information (e.g., a QoS class) received from MTC system 190. Back-off timer module 420 may also, or alternatively, enable MTC device 110 to determine whether a back-off time that was based on a QoS class exceeds a back-off time threshold (e.g., a maximum amount of time that MTC device 110 may be permitted to wait before attempting another network attach operation). Back-off timer module 420 may also, or alternatively, enable MTC device 110 to re-calculate the back-off time based on an alternative mechanism or equation if the back-off time threshold is exceeded.

In addition to the functionality described above, the functional components of MTC device 110 may also, or alternatively, provide functionality as described elsewhere in this description. For example, in some implementations, MTC device 110 may perform one or more operations described as being performed by MTC system 190. Further, while FIG. 4 shows a particular number and arrangement of modules, in alternative implementations, MTC device 110 may include additional modules, fewer modules, different modules, or differently arranged modules than those depicted.

Figure 5:
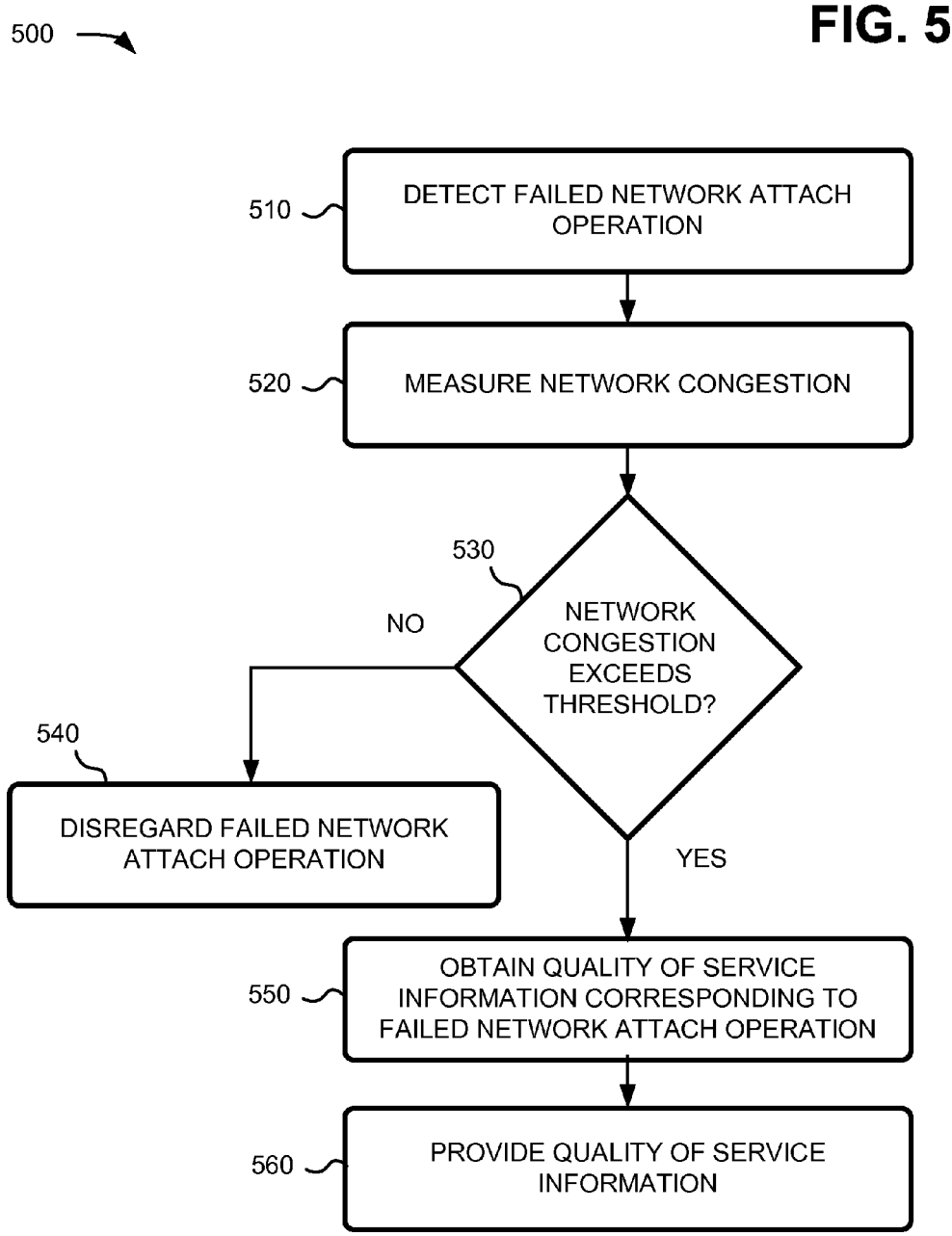
FIG. 5 is a diagram of an example process for handling a failed network attach operation according to one or more implementations described herein.

FIG. 5 is a diagram of an example process 500 for handling a failed network attach operation according to one or more implementations described herein. In one or more implementations, process 500 may be performed by one or more components of MTC system 190. In other implementations, some or all of process 500 may be performed by one or more other components/devices, or a group of components/devices, including or excluding MTC system 190. A description of FIG. 5 is provided below with reference to FIG. 6.

As shown in FIG. 5, process 500 may include detecting a failed network attach operation (block 510). For example, MTC system 190 may detect a failed network attach operation. A failed network attach operation may include a variety of scenarios, such as MTC device 110 attempting to connect to base station 120, but failing to gain complete access due to network congestion, signaling collisions, other sources of interference, etc.

As further shown in FIG. 5, process 500 may include measuring network congestion (block 520). For example, MTC system 190 may measure network congestion. In one example, MTC system 190 may measure a level of network congestion correspond to the failed network attach operation. Additionally, or alternatively, the level of network congestion may be associated with a particular type of wireless channel, such as a random access channel (RACH).

In some implementations, MTC system 190 may measure network congestion by receiving network performance information from base station 120, and/or another device of environment 100, and determining a current level of network congestion based on the information received. Additionally, or alternatively, MTC system 190 may receive network congestion rates, statistics, or other information from base station 120 and/or another device of environment 100. The network performance information and/or the network congestion rates, statistics, or other information may be received on a periodic basis, when requested by MTC system 190, and/or in response to the failed network attach operation being detected.

As further shown in FIG. 5, process 500 may also include determining whether network congestion has exceeded a network congestion threshold (block 530). For example, MTC system 190 may determine whether the level of network congestion has exceeded a network congestion threshold. In one example, the same network congestion threshold may be applicable regardless of the type of MTC device 110 involved, the type of radio network involved, the time of day, or any other type of network condition. However, in another example, the network congestion threshold may change depending on the type of MTC device 110 involved, the type of wireless network involved, the time of day, the frequency with which recent network attach operations have failed, and/or another type of network condition or scenario. Additionally, or alternatively, the network congestion threshold may be associated with a particular type of wireless channel, such as a RACH.

If the network congestion has not exceeded the network congestion threshold (block 530—No), process 500 may include disregarding the network attach operation (block 540). For example, MTC system 190 may disregard the network attach operation when the level of network congestion does not exceed the network congestion threshold. In one example, while MTC system 190 may disregard the failed network attach operation, MTC system 190 may still maintain a record of the failed network attach operation since doing so may be useful in subsequently determining the level of network congestion in a network and/or modifying the network congestion threshold in accordance with perceived network conditions.

If the network congestion exceeds the network congestion threshold (block 530—Yes), process 500 may include obtaining QoS information corresponding to the failed network attach operation (block 550). For example, MTC system 190 may obtain QoS information corresponding to the network attach operation. In some implementations, MTC system 190 may obtain the QoS information by collecting an identifier from the failed network attach operation. The identifier may include a device identifier, a device type identifier, a service type identifier, a radio network identifier, or another type of identifier corresponding to MTC device 110 and/or the failed network attach operation.

FIG. 6 is a diagram of an example QoS map data structure 600 according to one or more implementations described herein. As depicted in FIG. 6, QoS map data structure 600 may define associations between device service types, service identifiers, and/or QoS classes. For example, according to QoS map data structure 600, emergency service devices may correspond to service identifier 1111, and service identifier 1111 may correspond to QoS class AAAA. QoS class AAAA may also correspond to service identifier 2222, and service identifier 2222 may correspond to home invasion device services. Electricity meter service devices may correspond to service identifier 3333, and service identifier may correspond to QoS class BBBB. Gas meter device services may correspond to service identifier 4444, and service identifier 4444 may correspond to QoS class CCCC.

In one example, MTC system 190 may reference QoS map data structure 600, or another type of data structure, to obtain QoS information corresponding to a failed network attach operation. The types of information illustrated in FIG. 6 are provided for explanatory purposes only. For instance, in other implementations, a QoS map data structure may include additional types of information, alternative types of information, or a different arrangement of types of information then depicted in FIG. 6. Additionally, or alternatively, MTC system 190 may reference an additional type of data structure, an alternative type of data structure, another type of data source to obtain QoS information.

In some implementations, QoS map data structure 600 may be within memory 230 of MTC system 190. Additionally, or alternatively, QoS map data structure 600 may be located in a memory stored by a storage device that is external and/or remote to MTC system 190.

Returning to FIG. 5, process 500 may include providing the QoS information (block 560). For example, MTC system 190 may provide the QoS information (e.g., a QoS class) to MTC device 110. In one example, the QoS information may include a QoS class. However, the QoS information may also, or alternatively, include another type of information relating to QoS, such as information associated with a QoS class in a QoS map data structure, information corresponding to the QoS of a particular network, back-off information associated with a QoS class, etc.

While FIG. 5 shows a flowchart diagram of an example process 500 for handling a failed attach operation, in other implementations, a process for handling a failed attach operation may include fewer operations, different operations, differently arranged operations, or additional operations than depicted in FIG. 5. Also, some of the operations can be performed in parallel.

FIG. 7 is a diagram of an example process 700 for re-attempting a network attach operation according to one or more implementations described herein. In one or more implementations, process 700 may be performed by one or more components of MTC device 110. In other implementations, some or all of process 700 may be performed by one or more other components/devices, or a group of components/devices, including or excluding MTC device 110. A description of FIG. 7 is provided below with reference to FIG. 8.

Process 700 may include receiving quality of service information (block 710). For example, MTC device 110 may receive QoS information. In one example, MTC device 110 may receive QoS information from MTC system 190 in response to a failed network attach operation. The QoS information may include a QoS class or another type of information relating to QoS and/or the operations described herein.

As depicted in FIG. 7, process 700 may include determining a back-off time based on the QoS information (block 720). For example, MTC device 110 may determine a back-off time base on QoS information. As mentioned above, the QoS information may be received from MTC system 190 in response to, for example, a failed network attach operation involving MTC device 110.

FIG. 8 is a diagram of example formulas 800 for determining a back-off time according to one or more implementations described herein. As depicted, formulas 800 include a QoS-based formula 810 and an alternative formula 820. According to QoS-based formula 810, the back-off time may be equal to a duration (T) that is based on QoS information, plus a randomly generated number (k) between a range of numbers that is based on a quantity of network attach failures and multiplied by a unit of time (t) (e.g., milliseconds, seconds, minutes, hours, days, etc.) that is also based on QoS information.

The components of QoS-based formula 810 may provide a dynamic solution for controlling network congestion for MTC devices 110. For example, since duration T may be dependent on QoS information (e.g., QoS class), MTC devices 110 associated with urgent services (e.g., emergency-related services) may have shorter back-off times than MTC devices 110 associated with non-urgent services (e.g., utility meters). In addition, since k may be a random number, the back-off time for MTC devices 110 associated with the same QoS information may vary, thereby defusing network congestion amongst MTC devices 110 providing similar services (e.g., devices with the same QoS class). Further, since the range of numbers ($2^h$-1) used for randomly selecting k may be based on the number of failed network attach operations, the potential variance between back-off times of MTC devices 110 associated with the same QoS class may increase with each failed attempt, thereby further defusing network congestion. Also, since the unit of time (t) assigned to k may also be based on QoS information (e.g., "k*t(QoS)"), the back-off time for MTC devices 110 associated with different QoS information may vary greatly. As such, back-off time 810 may provide multiple mechanisms for controlling or defusing network congestion for MTC device 110.

Returning now to FIG. 7, process 700 may include determining whether the back-off time exceeds a back-off time threshold. For example, MTC device 110 may determine whether the back-off time exceeds a back-off time threshold. In one example, a back-off time threshold may be a maximum duration that a particular MTC device 110, a particular type of MTC device 110, or a particular group of MTC devices 110, may wait before attempting to re-attach to a network. In some implementations, the back-off time threshold may be stored locally by MTC device 110. Additionally, or alternatively, the back-off time threshold may be received from another device, such as MTC system 190.

Providing a back-off time threshold may provide an additional mechanism for controlling back-off times corresponding to MTC devices 110. For example, if network conditions are such that a particular MTC device 110 has experienced multiple network attach operation failures, the back-off time for that particular MTC device 110 may become very long, especially since k includes an exponential relationship (e.g., $2^h$) and t may correspond to a relatively large unit of time, such as days, months, etc. As such, the back-off time threshold may provide MTC devices 110 with a way to enable back-off times to be based on QoS information, unless the back-off times exceed certain boundaries.

As further shown in FIG. 7, if the back-off time exceeds the back-off time threshold (block 730—Yes), process 700 may include re-calculating the back-off time. For example, MTC device 110 may re-calculate the back-off time if the back-off time exceeds the back-off time threshold. MTC device 110 may recalculate the back-off time based on a modified version of formula 810 or another formula that includes QoS considerations. Additionally, or alternatively, MTC 110 may recalculate the back-off time by modifying the previously calculated back-off time (e.g., by modifying the back-off time by a particular amount based on a difference between the back-off time and the back-off time threshold). MTC 110 may also, or alternatively, re-calculate the back-off time by using a formula that does not include QoS considerations.

For example, as depicted in FIG. 8, formula 820 is an example of a formula for re-calculating the back-off time that does not include QoS considerations. Similar to formula 810, formula 820 includes a randomly generated number between a range of numbers that is based on a quantity of failed network attach operations. However, formula 820 does not include a duration (e.g., T(QoS)) or a unit of time that is based on QoS. By contrast, the unit of time corresponding to formula 820 may be a default unit of time (e.g., millisecond, seconds, minutes, days, etc.). As such, formula 820 may provide an alternative to calculating a back-off time when, for example, a previously calculated back-off time exceeds a back-off time threshold.

As further shown in FIG. 7, if the back-off time does not exceed the back-off time threshold (block 730—No), or if the back-off time has been recalculated (block 740), process 500 may include re-attempting a network attach operation after the back-off time has expired (block 750). In one example, if the re-attempted network attach operation fails, process 700 may include calculating a new back-off time and/or performing one or more other operations, similar to those discussed above.

While FIG. 7 shows a flowchart diagram of an example process 700 for re-attempting a network attach operation, in other implementations, a process for re-attempting a network attach operation may include fewer operations, different operations, differently arranged operations, or additional operations than depicted in FIG. 7 and some may be I.

Accordingly, systems and/or devices may be used to control network congestion for machine-type communications (MTC). For example, MTC device 110 may attempt a network attach operation, but fail due to network congestion. In response, MTC system 190 may identify QoS information (e.g., a QoS class) corresponding to MTC device 110 and provide the QoS information to MTC device 110. MTC device 110 may use the QoS information to calculate a back-off time for attempting another network attach operation.

Since the back-off time determined by MTC device 110 is based on information received from MTC system 190, one or more of the implementations, described herein, may provide a solution to centralizing the management and control of MTC devices as they relate to back-off times. In addition, since the back-off time may be based on QoS information and since different types of MTC devices 110 may correspond to different QoS information, one or more of the implementations, described herein, may provide an effective solution to diffusing network congestion by staggering back-off times. Additionally, or alternatively, since back-off times may be based on QoS information, one or more of the implementations, described herein, may help ensure that back-off times for different types of MTC devices 110 are appropriate. For instance, a particular MTC device 110 associated with a less urgent service (e.g., a utility meter) may have a greater back-off time than another MTC device 110 associated with a more urgent service (e.g., a fire alarm system).

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   attempting, by a computing device, a network attach operation associated with a wireless network;
   receiving, by the computing device and based on a failure of the network attach operation, quality of service information from the wireless network;
   determining, by the computing device, a back-off time based on the received quality of service information,
   the back-off time corresponding to a duration of time before re-attempting the network attach operation;
   obtaining, by the computing device, information associated with a maximum amount of time that the computing device may wait before re-attempting the network attach operation;
   determining, by the computing device and based on the duration of time being greater than a duration of time associated with a back-off time threshold, that the back-off time exceeds the back-off time threshold,
   the back-off time threshold corresponding to the maximum amount of time that the computing device may wait before re-attempting the network attach operation;
   calculating, by the computing device and based on the back-off time exceeding the back-off time threshold, another back-off time,
   the another back-off time being shorter in duration than the duration of time associated with the back-off time, and
   the another back-off time being shorter in duration than a duration of the maximum amount of time that the computing device may wait before re-attempting the network attach operation; and
   re-attempting, by the computing device and after the another back-off time, the network attach operation.

2. The method of claim 1, where, when calculating the another back-off time, the method includes at least one of:
   modifying the back-off time by a particular amount based on a difference between the back-off time and the back-off time threshold, or re-calculating the back-off time using a formula.

3. The method of claim 2, where the formula comprises:
   a formula based on the quality of service information received from the wireless network, or a formula that is independent from the quality of service information.

4. The method of claim 1, where:
   the computing device comprises a machine-type communications device corresponding to a type of service, and
   the quality of service information is associated with the type of service corresponding to the machine-type communications device.

5. The method of claim 4, where the quality of service information corresponds to a level of urgency associated with the type of service corresponding to the machine-type communications device.

6. The method of claim 1, where, when determining the back-off time, the method includes:
   determining the back-off time based on a quantity of consecutive network attach operation failures associated with the computing device.

7. The method of claim 1, further comprising:
   detecting that the re-attempted network attach operation has failed;
   determining an additional back-off time based on the quality of service information and the failure of the re-attempted network attach operation; and
   attempting another network attach operation after the additional back-off time.

8. The method of claim 7, further comprising:
determining whether the additional back-off time exceeds the back-off time threshold; and calculating a shorter back-off time when the additional back-off time exceeds the back-off time threshold.

9. A computing device comprising:
a memory comprising instructions; and
a processor to execute the instruction to:
attempt a network attach operation associated with a wireless network;
detect that the network attach operation has failed;
receive, based on the detected failure of the network attach operation, quality of service information from the wireless network;
calculate a back-off time based on the received quality of service information, the back-off time corresponding to a duration of time;
obtain information associated with a maximum amount of time that the computing device may wait before re-attempting the network attach operation;
determine, based on the duration of time being greater than a duration of time associated with a back-off time threshold, that the back-off time exceeds the back-off time threshold, the back-off time threshold corresponding to the maximum amount of time that the computing device may wait before re-attempting the network attach operation;
re-calculate the back-off time when the back-off time exceeds the back-off time threshold,
the recalculated back-off time being shorter in duration than the duration of time associated with the back-off time, and
the recalculated back-off time being shorter in duration than a duration of the maximum amount of time that the computing device may wait before re-attempting the network attach operation; and
re-attempt the network attach operation after the re-calculated back-off time.

10. The computing device of claim 9, where, when re-calculating the back-off time, the processor is further to:
modify the back-off time based on a difference between the back-off time and the back-off time threshold, or re-calculate the back-off time using a formula.

11. The computing device of claim 10, where the formula comprises:
a formula based on the quality of service information received from the wireless network, or a formula that is independent from the quality of service information.

12. The computing device of claim 9, where:
the computing device comprises a machine-type communications device corresponding to a type of service, and
the quality of service information is associated with the type of service corresponding to the machine-type communications device.

13. The computing device of claim 9, where:
the processor is further to:
track a quantity of consecutive network attach operation failures, and when calculating the back-off time, the processor is further to:
calculate the back-off time based on the quantity of consecutive network attach operation failures associated with the computing device.

14. The computing device of claim 9, where the processor is further to:
receive information indicating that the re-attempted network attach operation failed;
determine an additional back-off time based on the quality of service information and the failure of the re-attempted network attach operation; and
attempt another network attach operation after the additional back-off time.

15. A non-transitory computer-readable storage medium storing instructions, the instructions comprising:
one or more instructions that, when executed by a processor, cause the processor to:
detect that a network attach operation, involving a machine-type communications device, has failed;
identify, based on detecting the network attach operation, the machine-type communications device corresponding to the network attach operation;
obtain quality of service information associated with the machine-type communications device; and
provide the quality of service information to the machine-type communications device to cause the machine-type communications device to:
calculate a back-off time consistent with the quality of service information, the back-off time corresponding to a duration of time;
obtain information associated with a maximum amount of time that the machine-type communications device may wait before re-attempting the network attach operation;
determine, based on the duration of time being greater than a duration of time associated with a back-off time threshold, that the back-off time exceeds the back-off time threshold,
the back-off time threshold corresponding to the maximum amount of time that the machine-type communications device may wait before re-attempting the network attach operation;
re-calculate the back-off time when the back-off time exceeds the back-off time threshold,
the recalculated back-off time being shorter in duration than the duration of time associated with the back-off time, and
the recalculated back-off time being shorter in duration than a duration of the maximum amount of time that the machine-type communications device may wait before re-attempting the network attach operation; and
re-attempt the network attach operation after the re-calculated back-off time.

16. The non-transitory medium of claim 15, where the instructions further comprise:
one or more instructions that, when executed by the processor, cause the processor to:
determine a level of network congestion corresponding to the failed network attach operation;
determine whether the level of network congestion exceeds a network congestion threshold;
disregard the failed network attach operation when the level of network congestion does not exceed the network congestion threshold;
obtain the quality of service information associated with the a machine-type communications device when the level of network congestion exceeds the network congestion threshold; and
provide the quality of service information to the machine-type communications device when the level of network congestion exceeds the network congestion threshold.

17. The non-transitory medium of claim 16, where:
the level of network congestion and the network congestion threshold correspond to a random access channel of a wireless network.

18. The non-transitory medium of claim 15, where the instructions further comprise:
one or more instructions that, when executed by the processor, cause the processor to:
associate device services corresponding to machine-type communications devices with service identifiers; and
associate the service identifiers with the quality of service information.

19. The non-transitory medium of claim 18, where the one or more instructions to obtain the quality of service information, include one or more instructions to:
identify an association between a service identifier corresponding to the machine-type communications device and the quality of service information.

20. The non-transitory medium of claim 15, where the quality of service information comprises quality of service class information.

* * * * *